(12) United States Patent
Lee et al.

(10) Patent No.: US 11,345,136 B2
(45) Date of Patent: May 31, 2022

(54) RESIN MOLDED ARTICLE AND MANUFACTURING METHOD THEREFOR

(71) Applicants: HONDA MOTOR CO., LTD., Tokyo (JP); Continental Automotive GmbH, Hannover (DE); SUNARROW LTD, Tokyo (JP)

(72) Inventors: Seonghun Lee, Wako (JP); Ryo Sato, Tokyo (JP); Tomoomi Kiyomiya, Tokyo (JP); YoungJin Hyun, Boon Keng Road (SG); Takezo Takahata, Boon Keng Road (SG)

(73) Assignees: HONDA MOTOR CO., LTD., Tokyo (JP); Continental Automotive GmbH, Hannover (DE); SUNARROW LTD, Tokyo (JP)

(*) Notice: Subject to any disclaimer, the term of this patent is extended or adjusted under 35 U.S.C. 154(b) by 0 days.

(21) Appl. No.: 16/996,954

(22) Filed: Aug. 19, 2020

(65) Prior Publication Data

US 2021/0053323 A1 Feb. 25, 2021

(30) Foreign Application Priority Data

Aug. 23, 2019 (JP) .............................. JP2019-152458

(51) Int. Cl.
*B32B 37/15* (2006.01)
*B32B 27/08* (2006.01)
(Continued)

(52) U.S. Cl.
CPC .......... *B32B 37/15* (2013.01); *B29C 35/0805* (2013.01); *B29C 39/026* (2013.01);
(Continued)

(58) Field of Classification Search
CPC ... B29C 35/0805; B29C 39/026; B29C 41/02; B29C 41/22; B29C 65/1406;
(Continued)

(56) References Cited

U.S. PATENT DOCUMENTS 6,099,929 A * 8/2000 Chinen .................. G06F 3/039
248/205.3
2011/0088827 A1 4/2011 Zanini et al.
(Continued)

FOREIGN PATENT DOCUMENTS

CN 102039852 5/2011
JP 2013-166248 8/2013
(Continued)

OTHER PUBLICATIONS

Japanese Office Action for Japanese Patent Application No. 2019-152458 dated Mar. 23, 2021.
(Continued)

*Primary Examiner* — John L Goff, II
(74) *Attorney, Agent, or Firm* — Amin, Turocy & Watson, LLP (57) ABSTRACT

A resin molded article is equipped with a resin base material layer, a cover layer, and a design layer. The design layer is provided on a design side end surface of the resin base material layer, whereas the cover layer is provided on a cover side end surface which is a rear surface of the design side end surface. Further, the cover layer includes a first end surface facing toward the cover side end surface, and a second end surface which is a rear surface of the first end surface. The first end surface is covered by a first coating layer, and the second end surface is covered by a second coating layer.

3 Claims, 11 Drawing Sheets

(51) Int. Cl.
- *B32B 3/30* (2006.01)
- *B29C 35/08* (2006.01)
- *B29C 39/02* (2006.01)
- *B32B 37/10* (2006.01)
- *B32B 37/24* (2006.01)
- *B32B 38/00* (2006.01)

(52) U.S. Cl.
CPC ............... *B32B 3/30* (2013.01); *B32B 27/08* (2013.01); *B32B 37/1054* (2013.01); *B29C 2035/0827* (2013.01); *B29C 2795/007* (2013.01); *B32B 38/145* (2013.01); *B32B 2037/243* (2013.01); *B32B 2255/10* (2013.01); *B32B 2307/732* (2013.01); *B32B 2309/105* (2013.01); *B32B 2309/12* (2013.01); *B32B 2310/0831* (2013.01); *B32B 2451/00* (2013.01)

(58) Field of Classification Search
CPC ............ B29C 65/70; B29C 2035/0827; B29C 2795/007; B32B 37/1054; B32B 37/15; B32B 2035/0827; B32B 2795/007; B32B 38/145; B32B 2037/243; B32B 2309/105; B32B 2309/12; B32B 2310/0831; B32B 3/30; B32B 2451/00
See application file for complete search history.

(56) References Cited

U.S. PATENT DOCUMENTS

| | | | |
|---|---|---|---|
| 2016/0221315 A1* | 8/2016 | Saiki | G06F 3/0412 |
| 2017/0174938 A1* | 6/2017 | Shin | C03C 17/30 |
| 2017/0283573 A1* | 10/2017 | Lee | B32B 1/00 |
| 2019/0283374 A1* | 9/2019 | Lee | B32B 3/30 |
| 2019/0283397 A1* | 9/2019 | Lee | B41F 15/08 |
| 2020/0122367 A1 | 4/2020 | Shiina et al. | |
| 2021/0238454 A1* | 8/2021 | Maki | C09J 7/50 |

FOREIGN PATENT DOCUMENTS

| | | | |
|---|---|---|---|
| JP | 2018-058223 | 4/2018 | |
| JP | 2018-062102 | 4/2018 | |
| JP | 6405004 B1 * | 10/2018 | ............ B32B 27/00 |
| JP | 2019-018426 | 2/2019 | |
| WO | 2011/149048 | 12/2011 | |
| WO | WO-2019208665 A1 * | 10/2019 | ............ C08J 7/043 |

OTHER PUBLICATIONS

Chinese Office Action and Search Report for Chinese Patent Application No. 202010838449.0 dated Feb. 21, 2022.

* cited by examiner

RESIN MOLDED ARTICLE AND MANUFACTURING METHOD THEREFOR

CROSS-REFERENCE TO RELATED APPLICATION

This application is based upon and claims the benefit of priority from Japanese Patent Application No. 2019-152458 filed on Aug. 23, 2019, the contents of which are incorporated herein by reference.

BACKGROUND OF THE INVENTION

Field of the Invention

The present invention relates to a resin molded article having a design layer that is visible through a cover layer, as well as to a method of manufacturing the same.

Description of the Related Art

A resin molded article in which a design layer provided in the interior thereof can be visually recognized from the exterior through a cover layer is widely used, for example, as a so-called smart key housing. The design layer is visually recognized by a user as a decorative pattern in the form of characters, symbols, figures or the like, and serves as an aesthetic element.

For example, in Japanese Laid-Open Patent Publication No. 2013-166248, a technique is disclosed for obtaining a resin molded article by joining a first resin molded article having a first sheet provided on one end surface thereof, and a second resin molded article having a second sheet provided on one end surface thereof. In this case, the first resin molded article and the second resin molded article, which are stacked or laminated on each other, form a resin base material layer, and a decorative layer (design layer) that is sandwiched between the first resin molded article and the second resin molded article is visible through the first sheet or the second sheet (cover layer).

In this instance, in the technique described in Japanese Laid-Open Patent Publication No. 2013-166248, the first resin molded article and the second resin molded article are manufactured by subjecting a liquid curable resin to curing (hardening). The first sheet and the second sheet, respectively, are individually attached to the liquid curable resin in advance, and thereafter, the liquid curable resin is cured (hardened). Consequently, the first resin molded article on which the first sheet is provided, and the second resin molded article on which the second sheet is provided are separately obtained. An ultraviolet curable resin may be cited as a typical example of the liquid curable resin.

SUMMARY OF THE INVENTION

If the thickness of the resin molded article is large, the resin molded article tends to be bulky and inconvenient to carry. Thus, it may be considered to reduce insofar as possible the thickness of the cover layer and the like.

Incidentally, as noted above, the resin base material layer on which the cover layer is provided is produced by curing (hardening) a liquid curable resin to which the cover layer is attached. At the time of such curing, and more specifically, in a process of curing the liquid curable resin so as to be converted into the resin base material layer, a defect becomes apparent in that bending (distortion or strain) of the cover layer having a particularly small thickness easily occurs.

A principal object of the present invention is to provide a resin molded article which is capable of preventing bending from occurring to a cover layer, even in the event that the thickness of the cover layer is small.

Another object of the present invention is to provide a method of manufacturing the above-described resin molded article.

According to one aspect of the present invention, a resin molded article is provided, including:

a resin base material layer made from an ultraviolet curable resin, and having a cover side end surface and a design side end surface forming a rear surface of the cover side end surface;

a cover layer made from a polymer membrane, and provided on the cover side end surface of the resin base material layer; and a design layer provided on the design side end surface of the resin base material layer and configured to be visible through the cover layer;

wherein the cover layer includes a first end surface facing toward the cover side end surface of the resin base material layer, and a second end surface forming a rear surface of the first end surface; and the resin molded article further includes a first coating layer configured to cover the first end surface, and a second coating layer configured to cover the second end surface.

According to another aspect of the present invention, a method of manufacturing a resin molded article is provided, wherein the resin molded article includes:

a resin base material layer made from an ultraviolet curable resin, and having a cover side end surface and a design side end surface forming a rear surface of the cover side end surface;

a cover layer made from a polymer membrane, and provided on the cover side end surface of the resin base material layer; and a design layer provided on the design side end surface of the resin base material layer and configured to be visible through the cover layer;

the method of manufacturing the resin molded article including:

an introduction step of introducing an ultraviolet curable resin into a mold having an upper end which is an open end to thereby obtain a precursor of the resin base material layer;

a coating step of coating a first end surface of the cover layer made from polymer membrane with a first coating layer, while coating a second end surface forming a rear surface of the first end surface with a second coating layer;

a placement step of placing the cover layer on an end surface of the precursor that is accommodated in the mold and faces toward the open end, in a manner so that the first coating layer is positioned on a lower side, and the second coating layer is positioned on an upper side;

a leveling step of pressing the precursor on which the cover layer has been placed, through the cover layer, and leveling the end surface that faces toward the open end;

a curing step of applying ultraviolet rays to the precursor to harden the precursor, and obtaining the resin base material layer on which the cover layer is provided on the cover side end surface; and a design layer producing step of providing the design layer on the design side end surface forming a rear surface of the cover side end surface of the resin base material layer.

According to the present invention, the first coating layer is provided on the first end surface of the cover layer that faces toward the resin base material layer, and the second coating layer is provided on the second end surface that forms the rear surface of the first end surface. Since rigidity is imparted to the cover layer by the first coating layer and the second coating layer, when the ultraviolet curable resin (a precursor of the resin base material layer) on which the cover layer is provided is subjected to curing (hardening) and is converted into the resin base material layer, the occurrence of distortion or strain in the cover layer can be effectively suppressed.

Therefore, a resin molded article which is aesthetically pleasing in appearance can be obtained. Further, since the cover layer which is superior in terms of flatness is advantageously retained on the resin base material layer, it is unlikely that the cover layer will fall off from the resin base material layer. Stated otherwise, it is possible to avoid a situation in which the cover layer falls off from the resin base material layer.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A preferred embodiment of a resin molded article will be presented and described in detail below with reference to the accompanying drawings in relation to a manufacturing method therefor.

Figure 1:
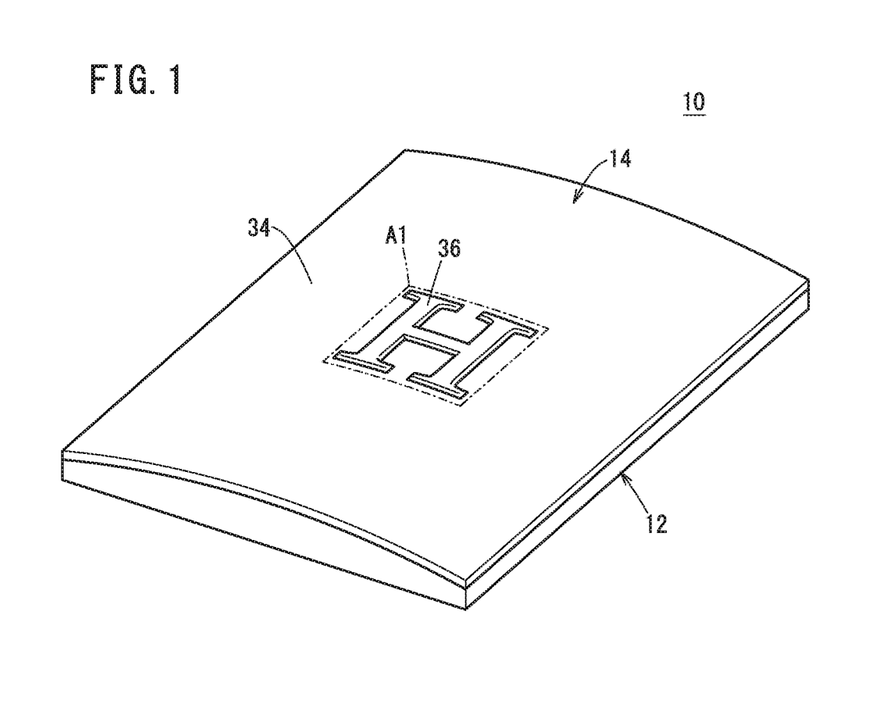
FIG. 1 is an overall schematic perspective view of a resin molded article according to an embodiment of the present invention.
Figure 2:
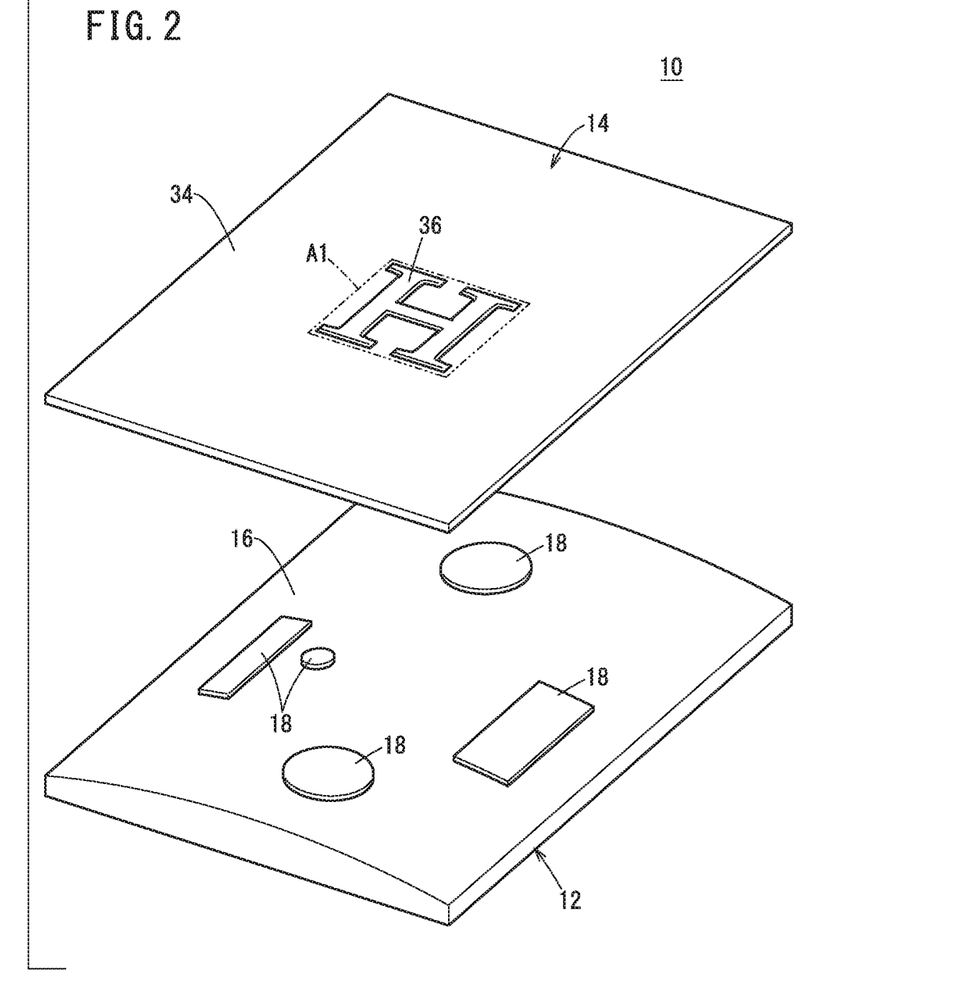
FIG. 2 is an exploded perspective view of the resin molded article shown in FIG. 1.
Figure 3:
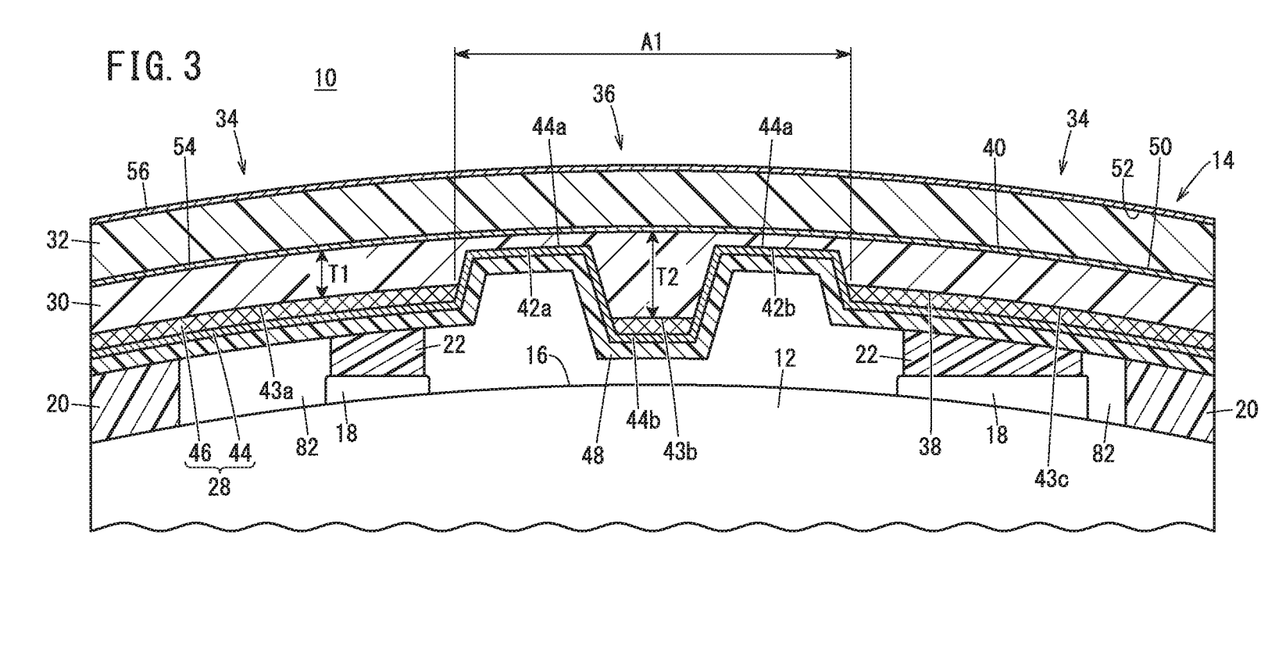
FIG. 3 is a cross-sectional view of the resin molded article shown in FIG. 1 in a stacking direction (vertical direction)

FIGS. 1 to 3, respectively, are an overall schematic perspective view, an exploded perspective view, and a cross-sectional view in a stacking direction (thickness direction) of a resin molded article 10 according to the present embodiment. The resin molded article 10 comprises a joined member 12, and a laminated body 14 that is joined to the joined member 12.

An upper surface 16 of the joined member 12 is gently curved so as to gradually bulge from the edges (ends in a widthwise direction thereof) toward the center in the widthwise direction. Stated otherwise, the joined member 12 is slightly rounded.

In this case, the joined member 12 is a housing in which electronic components (not shown) such as a circuit board or the like are accommodated in the interior thereof. As shown in FIGS. 2 and 3, from the smooth upper surface 16 of the joined member 12, a plurality of hollow projections 18 (five as shown in FIG. 2) project out therefrom for avoiding interference with the electronic components that are accommodated in the interior. Therefore, the upper surface 16 of the joined member 12 forms concave portions that are depressed relative to the hollow projections 18.

As shown in FIG. 3, the joined member 12 is joined to the laminated body 14 via a joining tape 20. Further, a guide tape 22 is interposed between the joined member 12 and the laminated body 14. The joining tape 20 is a double-sided tape, whereas the guide tape 22 is a single-sided tape. Further, the thickness of the joining tape 20 is greater than that of the guide tape 22.

The joining tape 20 is provided at a position corresponding to the smooth upper surface 16 of the joined member 12. On the other hand, the guide tape 22 is provided at positions corresponding to the hollow projections 18. Therefore, the joining tape 20 and the guide tape 22 are separated from each other. Moreover, the joining tape 20 and the guide tape 22 are disposed on a later-described base portion 34, but neither one is disposed on a pattern portion 36. Further, an adhesive surface of the guide tape 22 faces toward a lower end surface of the laminated body 14.

The laminated body 14 comprises a design layer 28, a resin base material layer 30, and a cover layer 32, and the base portion 34 and the pattern portion 36 are formed thereon. In this case, the pattern portion 36 includes a decorative character "H". The user is capable of visually perceiving the decorative character "H" as though it was rising up in a three-dimensional manner with respect to the base portion 34.

Hereinafter, the lower end surface of the resin base material layer 30 in FIG. 3 will be referred to as a design side end surface, and the upper end surface thereof will be referred to as a cover side end surface, and the reference numerals 38 and 40 will be assigned respectively to design side and cover side end surfaces. Two groove-shaped concave portions 42a and 42b that extend from a front side to the rear side of the paper sheet of FIG. 3 are formed in a design side end surface 38. The concave portions 42a and 42b correspond respectively to the two vertical leg portions of the decorative character "H". Convex portions 43a to 43c which project out relatively with respect to the concave portions 42a and 42b are formed in the design side end surface 38.

The concave portions 42a and 42b are depressed toward the upper end side (toward the cover layer 32). Further, the concave portions 42a and 42b become deeper as they approach toward each other. More specifically, the concave portions 42a and 42b are deepest at positions that face toward each other and are shallowest at positions farthest apart from each other. Moreover, the depth of a recess (not shown) for forming a horizontal bar portion of the decorative character "H" is approximately the same as the deepest parts of the concave portions 42a and 42b.

The design layer 28 includes a metal layer 44 and a printed layer 46 as a shielding layer that covers portions of the metal layer 44. The base portion 34 is formed by covering the metal layer 44 with the printed layer 46, whereas the pattern portion 36 is formed by exposing the metal layer 44 from the printed layer 46. These points will be described in detail below.

The metal layer 44 is disposed over the entirety of the design side end surface 38 of the resin base material layer 30 including the concave portions 42a and 42b and the convex portions 43a to 43c. When the user observes the resin molded article 10 or the laminated body 14 in plan view from the side of the cover layer 32, the user is capable of visually perceiving exposed portions 44a of the metal layer 44 that are exposed without being shielded by the printed layer 46. In other words, the pattern portion 36 is formed. By exhibiting glossiness, the metal layer 44 further improves the design. Moreover, the exposed portions 44a are formed in the shape of the letter "H" as a whole, and are visually recognized by the user as the decorative character "H".

Portions of the metal layer 44 other than the exposed portions 44a are shielded portions 44b that are covered (shielded) by the printed layer 46. Stated otherwise, the printed layer 46 is interposed between the shielded portions 44b of the metal layer 44 and the resin base material layer 30. Therefore, a situation is brought about in which the shielded portions 44b are concealed behind the printed layer 46 from a user who uses the resin molded article 10, and are incapable of being visually perceived. In accordance therewith, the base portion 34 is formed.

The printed layer 46 exhibits a color that differs from that of the metal layer 44. The printed layer 46 is preferably black. This is because, in this case, a pronounced difference in contrast from the glossiness of the metal layer 44 is significant, and therefore, the exposed portions 44a, or in other words, the aesthetic appearance of the decorative character "H" is improved.

As suitable materials for the metal layer 44, there may be cited indium, tin, or alloys thereof or the like. Since such metals exhibit radio wave permeability, in the case that the resin molded article 10 is used as a smart key, it is possible to avoid hindering communications from the smart key to the vehicle body. On the other hand, as suitable materials for the printed layer 46, there may be cited urethane resin, vinyl chloride resin, and the like.

The resin base material layer 30 is made from an ultraviolet curable resin. Such an ultraviolet curable resin is comparatively flexible, and therefore, when an external force is applied in order to cause the laminated body 14 to bend, the laminated body 14 is easily bent. In this manner, the resin base material layer 30 provides the laminated body 14 with flexibility.

The printed layer 46 is more flexible than the resin base material layer 30. More specifically, an elongation percentage of the printed layer 46 is greater than that of the resin base material layer 30, and the Shore D hardness thereof is less than that of the resin base material layer 30. Therefore, the printed layer 46 and the metal layer 44 easily bend (curve) in conformity with change in shape of the resin base material layer 30. Accordingly, the printed layer 46 and the metal layer 44 are prevented from peeling off from the resin base material layer 30 due to a difference in flexibility.

In this instance, the elongation percentage is measured according to a so-called B method, which is specified by JIS K7161 (based on ASTM D638). The elongation percentages of the resin base material layer 30 and the printed layer 46, for example, are on the order of 1 to 100% and 1 to 200%, respectively. Further, the Shore D hardnesses of the resin base material layer 30 and the printed layer 46, for example, are on the order of 60° to 90° and 70° to 90°, respectively.

A retaining layer 48 for the purpose of preventing the printed layer 46 and the metal layer 44 from falling off from the resin base material layer 30 is provided on a lower surface of the metal layer 44. The retaining layer 48 is formed, for example, from urethane resin, vinyl chloride resin, or the like, and exhibits a shape that conforms to the shape of the metal layer 44.

The pattern portion 36 is a portion within a virtual area A1 (see FIGS. 1 and 2) surrounding outermost edge portions of the decorative character "H". Accordingly, in the pattern portion 36, there are included the exposed portions 44a which are visually perceived as the decorative character "H", the shielded portions 44b within the virtual area A1, the printed layer 46 that covers the shielded portions 44b within the virtual area A1, and the resin base material layer 30 and the retaining layer 48 within the virtual area A1. In contrast thereto, the base portion 34 is a portion that lies outside of the virtual area A1. More specifically, the base portion 34 includes the shielded portions 44b on the outer side of the virtual area A1, the printed layer 46 that covers the shielded portions 44b on the outer side of the virtual area A1, and the resin base material layer 30 and the retaining layer 48 on the outer side of the virtual area A1.

As can be understood from FIG. 3, a thickness T1 of the resin base material layer 30 in the base portion 34 (outside of the virtual area A1) is set to be smaller than a thickness T2, in the pattern portion 36 (within the virtual area A1), of the resin base material layer 30 in the portion in which the printed layer 46 is formed. Therefore, the layer thickness of the base portion 34 is less than the layer thickness of the portion where the printed layer 46 exists in the pattern portion 36. Moreover, the layer thickness, which is a sum total of the thicknesses of the retaining layer 48, the metal layer 44 (the exposed portions 44a), and the resin base material layer 30 in the concave portions 42a and 42b within the pattern portion 36, is less than the aforementioned two layer thicknesses.

The cover layer 32 is provided on a cover side end surface 40, which is a curved plane, of the resin base material layer 30 on which the above-described design layer 28 is formed on the design side end surface 38. The cover layer 32 is made from a polymer membrane, and as a preferred example thereof, there may be cited polyethylene terephthalate (PET). A thickness of the cover layer 32 is set to be as small as possible, in order that the wall-thickness of the resin molded article 10 is made as small as possible. A preferred thickness of the cover layer 32 lies within a range of 150 to 200 μm.

The cover layer 32 includes a first end surface 50 facing toward the cover side end surface 40 of the resin base material layer 30, and a second end surface 52 which is a rear surface of the first end surface 50. As shown in FIG. 3, the first end surface 50 is an inner surface facing toward the interior of the laminated body 14, and the second end surface 52 is an outer surface which is exposed to the atmosphere.

The first end surface 50 is covered by or coated with a first coating layer 54. More specifically, the first coating layer 54 faces toward the cover side end surface 40 and is joined to the cover side end surface 40 and the first end surface 50. On the other hand, the second end surface 52 is covered by or coated with a second coating layer 56. Due to being coated thereby, the second end surface 52 is protected by the second coating layer 56.

In the above-described structure, the resin base material layer 30, the first coating layer 54, the cover layer 32, and the second coating layer 56 are thin-walled and transparent, to a degree such that they are capable of transmitting light. Therefore, when the user observes the resin molded article 10 in plan view (in an overhead view) from the exterior of the second coating layer 56, the user is capable of visually perceiving with ease the exposed portions 44a of the metal layer 44, and thus the decorative character "H", via the second coating layer 56, the cover layer 32, the first coating layer 54, and the resin base material layer 30.

As the material for the first coating layer 54, a material having excellent adhesion with respect to the resin base material layer 30 and the cover layer 32 is suitable. As representative examples of such a material, there may be cited acrylic resin, polyester resin, urethane resin, epoxy resin, and the like.

On the other hand, the material of the second coating layer 56 is preferably a material that is excellent in terms of its adhesion with respect to the cover layer 32, is superior in terms of abrasion resistance or scratch resistance, and is capable of preventing contaminants such as fingerprints or the like from adhering thereto. As such a material, mixed resins in which fluorine-based resins are added to the various resins that are the materials of the first coating layer 54 are exemplified.

The first coating layer 54 and the second coating layer 56, as will be described later, impart rigidity to the cover layer 32, whereby the coating layers serve to prevent the cover layer 32 from bending when the resin base material layer 30 is obtained from the ultraviolet curable resin. From this standpoint, the thicknesses of the first coating layer 54 and the second coating layer 56 may be set to a degree whereby such rigidity can be imparted to the cover layer 32.

However, as stated previously, the second coating layer 56 is preferably set to a thickness that exhibits sufficient abrasion resistance (scratch resistance) as well as a stain preventing function. From this standpoint, it is preferable that the thickness of the second coating layer 56 is set within a range of 2 to 10 μm.

In addition, in the case that the thickness of the second coating layer 56 is set within such a range, the thickness of the first coating layer 54 is preferably set as small as possible, in order to make the wall-thickness of the resin molded article 10 as small as possible. More specifically, it is preferable to make the thickness of the first coating layer 54 smaller in comparison with the thickness of the second coating layer 56.

On the other hand, if the thickness of the first coating layer 54 is excessively small, an unbalance occurs in the thicknesses of the first coating layer 54 and the second coating layer 56, and as a result, it is no longer possible to easily impart sufficient rigidity to the cover layer 32. To avoid such a situation, the thickness of the first coating layer 54 may be set to be greater than or equal to ½ the thickness (i.e., half the thickness) of the second coating layer 56. For example, the degree of flatness of the cover layer 32 becomes greater in the case that the thicknesses of the first coating layer 54 and the second coating layer 56 are respectively 3 to 4 μm and 5 μm, than a case in which the thicknesses thereof are respectively 2 μm and 5 μm.

Next, the functions and effects of the resin molded article 10 on which the first coating layer 54 and the second coating layer 56 are provided will be described in relation to a method of manufacturing the resin molded article 10 according to the present embodiment.

Figure 4:
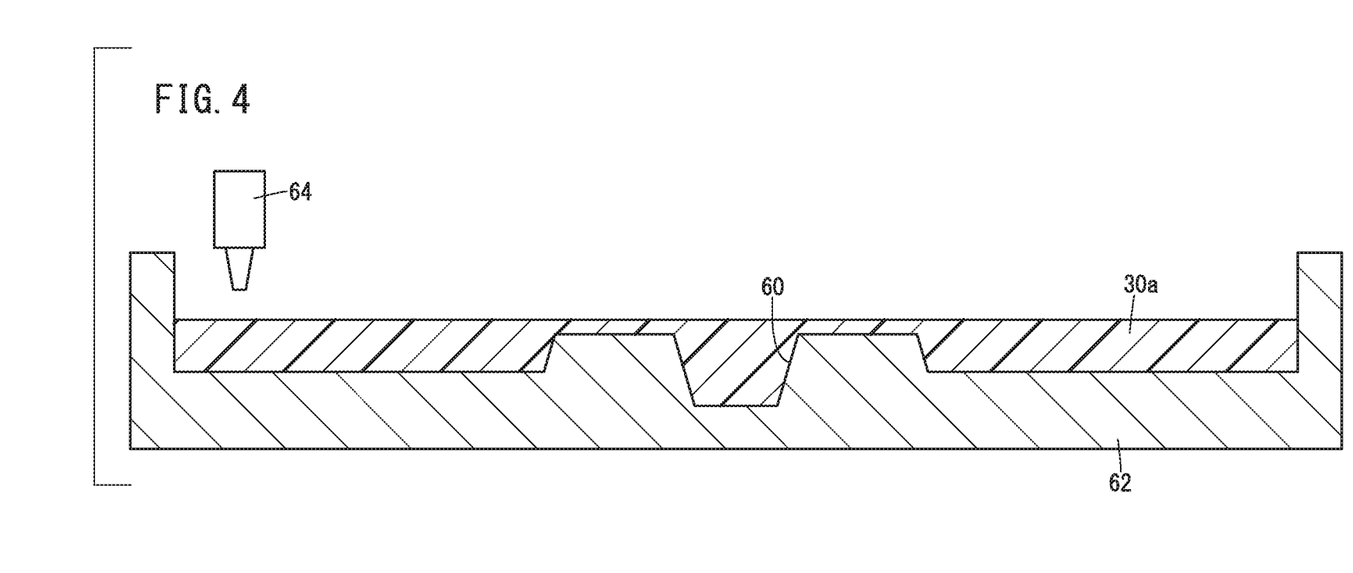
FIG. 4 is a schematic vertical cross-sectional view of essential parts showing a state in which an ultraviolet curable resin is introduced into a cavity of a mold by performing an introduction step.

In order to obtain the laminated body 14 that constitutes the resin molded article 10, initially, an introduction step S1 is performed. More specifically, as shown in FIG. 4, a mold 62 in which a cavity 60 is provided having a shape for molding the decorative character "H" is used. An upper end of the mold 62 is an open end which is largely open to the atmosphere. From this open end, an ultraviolet curable resin is injected (introduced) by a dispenser 64. After having been filled in the cavity 60, the ultraviolet curable resin overflows from the cavity 60, and the overflowed portions thereof join together and spread out on the open end side. Owing to the above-described actions, a precursor 30a of the resin base material layer 30 is obtained inside the mold 62. Needless to say, the precursor 30a is made up from a molded material of the ultraviolet curable resin.

On the other hand, in a coating step S2, the first coating layer 54 is provided on the first end surface 50 of the cover layer 32 (polymer membrane). For this purpose, by using the aforementioned materials, a known coating technique such as so-called roll-to-roll or spray coating or the like may be carried out. Thereafter, the second coating layer 56 is provided on the second end surface 52 of the cover layer 32 by the same aforementioned technique or the like.

The thickness of the first coating layer 54 and the thickness of the second coating layer 56 can be set, for example, respectively to 3 to 4 μm and 5 μm. Moreover, in the case of the roll-to-roll technique, each thickness may be adjusted when the first coating layer 54 and the second coating layer 56 are affixed thereto. Further, in the case of the spray coating technique, coating may be continuously carried out until the first coating layer 54 and the second coating layer 56 having predetermined thicknesses are obtained.

Moreover, the second coating layer 56 may be provided initially, and thereafter, the first coating layer 54 may be provided. Stated otherwise, the order in which the first coating layer 54 and the second coating layer 56 are formed is of no particular order. Further, although either one of the introduction step S1 or the covering step S2 may be performed first, from the standpoint of manufacturing efficiency, it is most preferable to perform both of steps S1 and S2 in parallel.

Figure 5:
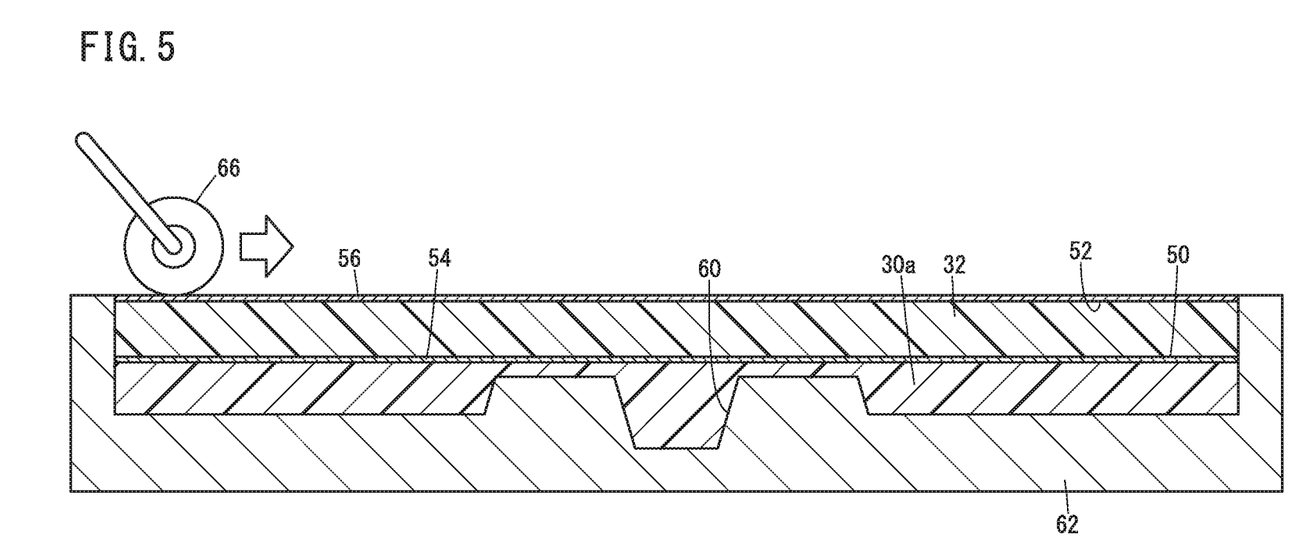
FIG. 5 is a schematic vertical cross-sectional view showing a state in which a roller, which serves as a leveling member, is used to perform a leveling step, after having performed a placement step of placing a cover layer on an ultraviolet curable resin (precursor)

Next, a placement step S3 is carried out. More specifically, as shown in FIG. 5, with respect to the precursor 30a, which is in a state of being accommodated in the mold 62, the cover layer 32, on which the first end surface 50 thereof is covered by the first coating layer 54 and the second end surface 52 thereof is covered by the second coating layer 56, is placed on the upper end surface that faces toward the open end of the mold 62. At this time, the first coating layer 54 faces toward the lower side (toward the precursor 30a), and the second coating layer 56 faces toward the upper side (toward the atmosphere).

In a state with the cover layer 32 placed on the precursor 30*a*, next, a leveling step S4 is performed. More specifically, as shown in FIG. 5, the cover layer 32 and the precursor 30*a* are pressed by a roller 66 (a leveling member). Furthermore, by advancing the roller 66 in the direction of the arrow, the soft precursor 30*a* (ultraviolet curable resin) is leveled and the thickness thereof is adjusted. Moreover, although it is sufficient for the roller 66 to travel one time in one direction, if required, the roller 66 may be moved back and forth one or more times.

Figure 6:
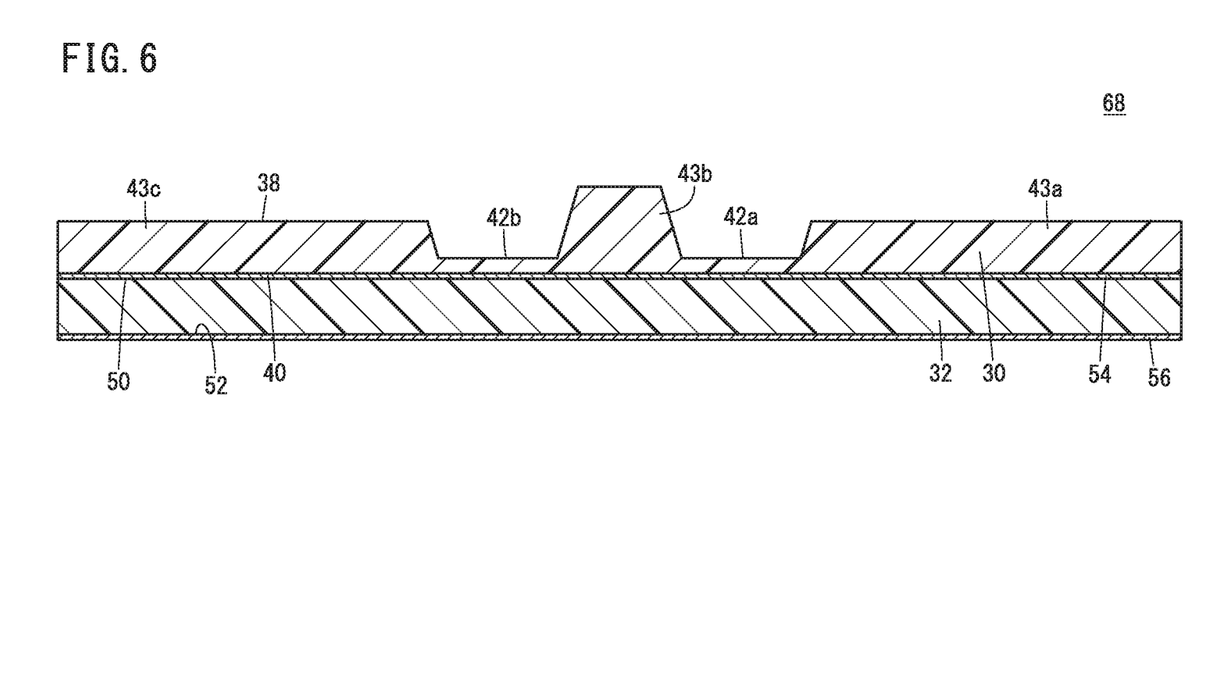
FIG. 6 is a schematic vertical cross-sectional view of essential parts of a composite body having a resin base material layer, a first coating layer, a cover layer, and a second coating layer.

Next, in a curing step S5, the precursor 30*a* the thickness of which has been adjusted is subjected to curing (hardening). According to the present embodiment in which the precursor 30*a* is made from an ultraviolet curable resin, the precursor 30*a* is irradiated with ultraviolet rays. Consequently, the precursor 30*a* undergoes curing (i.e., the precursor is hardened), and as a result, the resin base material layer 30 is obtained. During this step, the first coating layer 54 becomes adhered to the cover side end surface 40 of the resin base material layer 30, and as shown in FIG. 6, the composite body 68 of the resin base material layer 30 and the cover layer 32 is obtained. At this point in time, the resin base material layer 30 includes the convex portions 43*a* to 43*c* in which the portion that is filled in the cavity 60 is cured (hardened), and the concave portions 42*a* and 42*b* which are interposed between the convex portions 43*a* to 43*c*.

When the precursor 30*a* undergoes curing (hardening) and is converted into the resin base material layer 30, contraction in the volume thereof takes place. At this time, the cover layer 32 that was placed on the precursor 30*a* is pulled by the contracting precursor 30*a*. In particular, in the case that the cover layer 32 is of a small thickness on the order of about 150 to 200 μm, if an unbalance in the amount of contraction of the precursor 30*a* is large, there is a concern that bending (distortion or strain) of the cover layer 32 may occur.

However, according to the present embodiment, the first end surface 50 of the cover layer 32 is coating with the first coating layer 54, together with the second end surface 52 being coating with the second coating layer 56. The first coating layer 54 and the second coating layer 56 impart rigidity to the cover layer 32. Therefore, it is possible to effectively suppress the occurrence of bending (distortion or strain) in the cover layer 32.

Since bending thereof is suppressed, the cover layer 32 which has a large degree of flatness is unlikely to fall off from the resin base material layer 30. Accordingly, in a subsequent design layer producing step S6, the state in which the cover layer 32 is retained on the resin base material layer 30 is preserved.

Figure 7:
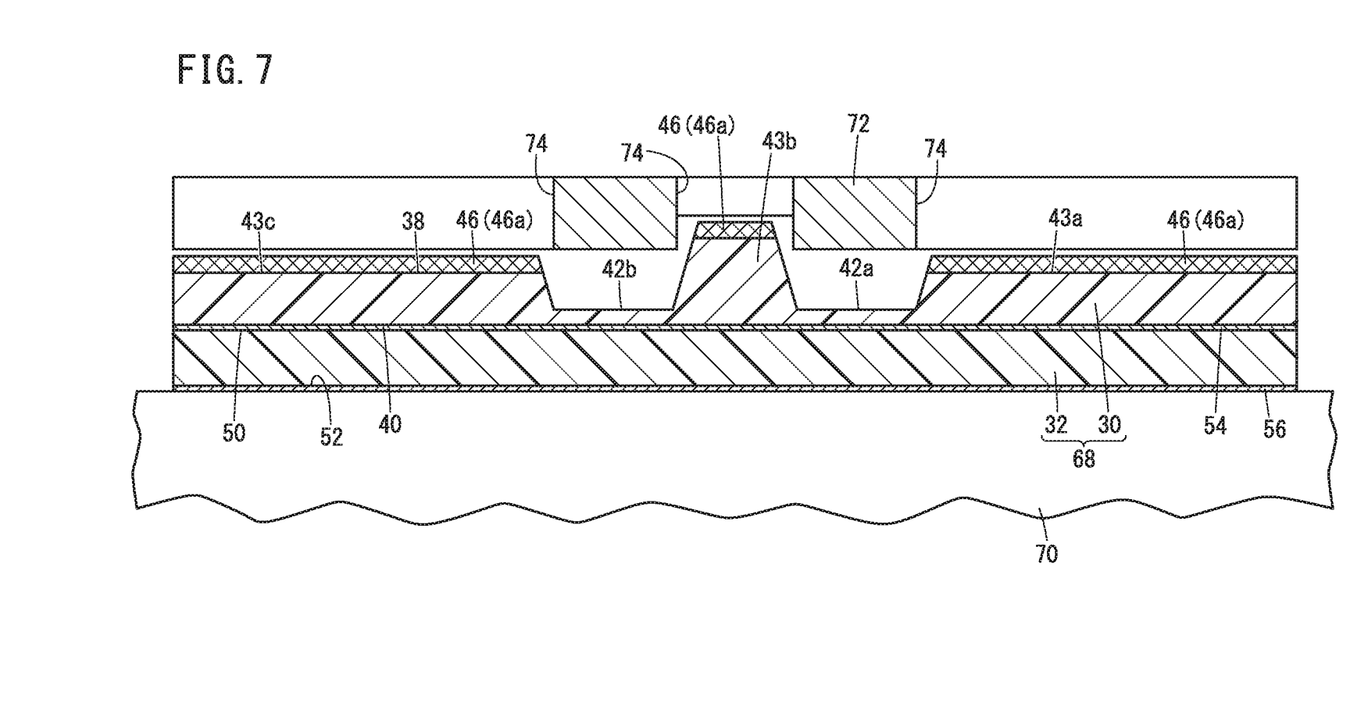
FIG. 7 is a schematic vertical cross-sectional view of essential parts showing a state in which ink is printed by a screen printing device on the composite body shown in FIG. 6.
Figure 8:
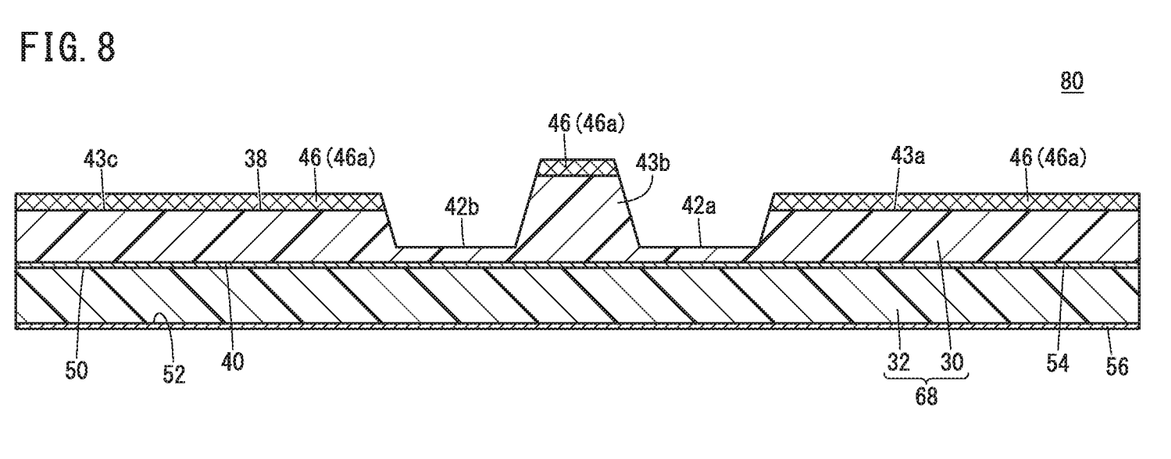
FIG. 8 is a schematic vertical cross-sectional view of essential parts of the composite body on which a printed layer is formed.

Next, the design layer producing step S6 is carried out. In greater detail, the composite body 68, which has been taken out from the mold 62, is set in a screen printing device. As shown in FIG. 7, such a screen printing device is equipped with a pedestal portion 70 and a screen 72. The composite body 68 is retained on the pedestal portion 70, at a posture in which the top surfaces of the convex portions 43*a* to 43*c* are oriented upward. Further, passage openings 74 are formed in the screen 72 at positions corresponding to the top surfaces of the convex portions 43*a* to 43*c*. Then, an ink 46*a* is ejected onto the screen 72. The ink 46*a* that has passed through the passage openings 74 adheres to the top surfaces of the convex portions 43*a* to 43*c*. Stated otherwise, as shown in FIG. 8, the ink 46*a* is printed on the top surfaces of the convex portions 43*a* to 43*c*. A composite body 80 is obtained by the ink 46*a* drying and thereby forming the printed layer 46.

Figure 9:
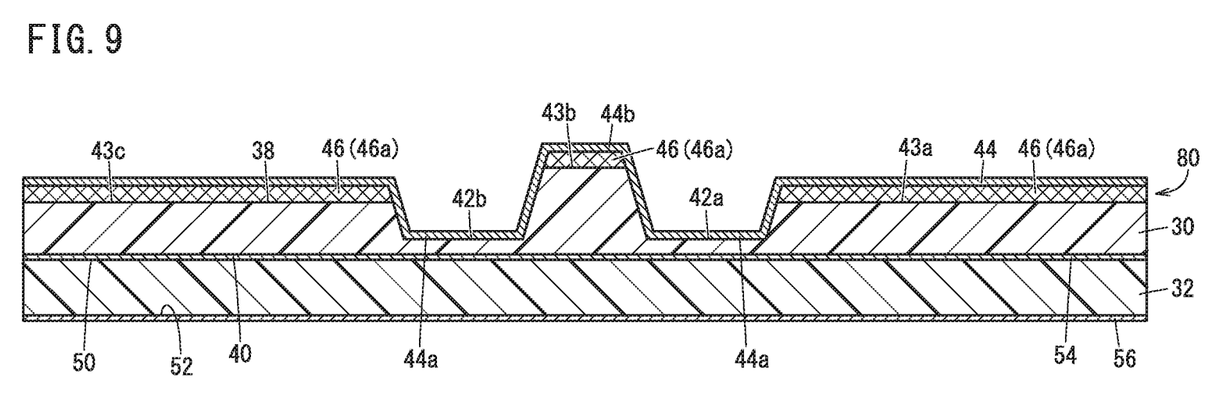
FIG. 9 is a schematic vertical cross-sectional view of essential parts showing a state in which a metal layer is provided on the composite body shown in FIG. 8.

Next, as shown in FIG. 9, the metal layer 44 is formed. At this time, for example, metal vapor deposition may be performed. As the metal, as noted previously, there is preferably selected one from among indium, tin, alloys thereof, or the like. This is because, in this case, the metal layer 44 which exhibits permeability to radio waves can be easily obtained.

Figure 10:
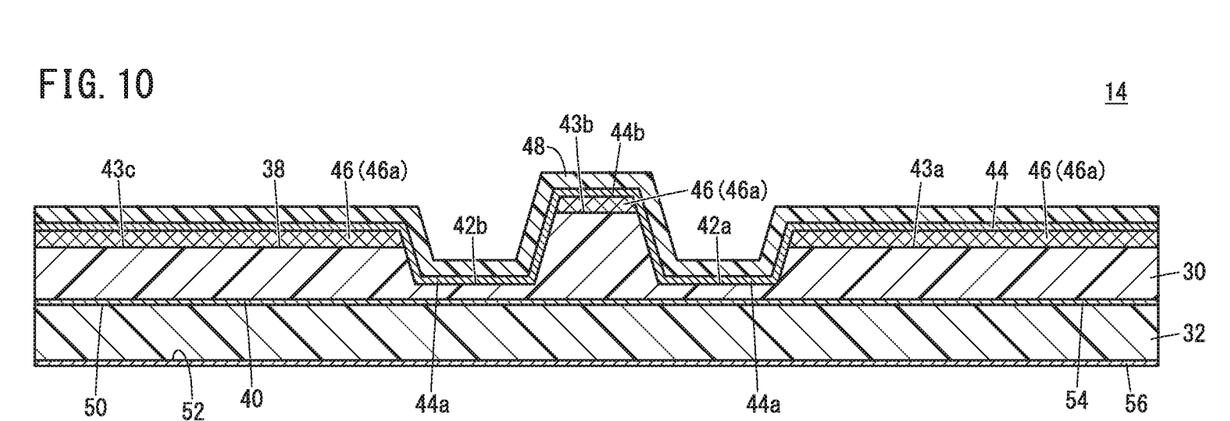
FIG. 10 is a schematic vertical cross-sectional view of essential parts showing a state in which a retaining layer is further provided with respect to the state shown in FIG. 9.

Furthermore, if necessary, as shown in FIG. 10, the retaining layer 48 is formed on the metal layer 44. The retaining layer 48 can be formed, for example, by spraying a urethane resin, a vinyl chloride resin, or the like with a coating machine. In accordance with this feature, the retaining layer 48 which follows the shape of the metal layer 44 is obtained, thereby resulting in the laminated body 14 being obtained. Portions where the retaining layer 48 is not desired to be formed may be covered by way of masking beforehand.

Figure 11:
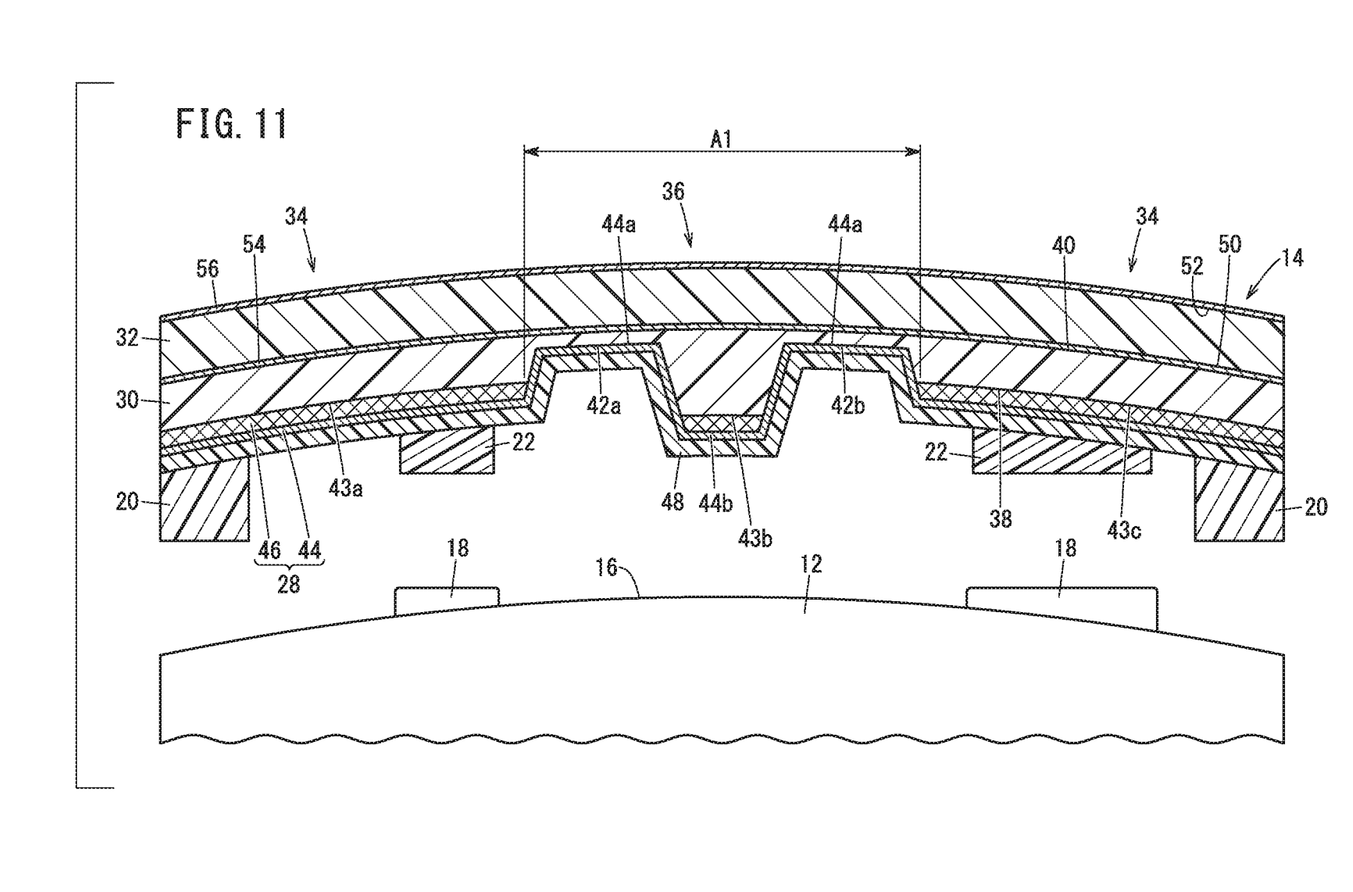
FIG. 11 is a schematic vertical cross-sectional view of essential parts showing a state in which a laminated body constituting the resin molded article shown in FIG. 1 is curved and joined to a joined member.

Next, the laminated body 14 which is obtained in the manner described above is affixed to the joined member 12 (for example, a smart key housing) via the joining tape 20, while being curved as shown in FIG. 11. When the curved laminated body 14 is stacked on the joined member 12, the posture and position of the laminated body 14 may be set so that the guide tape 22 is disposed on and abuts against the hollow projections 18. Consequently, since the relative positioning between the laminated body 14 and the joined member 12 is determined, it is made easy for the laminated body 14 to be affixed, or in other words, to be joined to the joined member 12.

From the fact that the guide tape 22 is a single-sided tape, it is only placed in contact with the hollow projections 18, and does not participate in joining the design layer 28 of the laminated body 14 and the joined member 12. Stated otherwise, it is only the joining tape 20, which is a double-sided tape, that participates in joining the design layer 28 (the laminated body 14) and the joined member 12. Therefore, it is easy to correct the positioning of the laminated body 14 prior to pressing the laminated body 14 firmly against the joined member 12, during a period in which a sufficient adhesive force is not yet developed immediately after the joining tape 20 has been temporarily affixed to the joined member 12.

In order to join the laminated body 14 to the joined member 12 through a sufficient adhesive force of the joining tape 20, an operator presses the laminated body 14 toward the joined member 12 with the fingers. In this instance, according to the present embodiment, the joining tape 20 and the guide tape 22 are affixed only to the base portion 34, and are not affixed to the pattern portion 36. Accordingly, accompanying such pressing, even in the case that the joining tape 20 and the guide tape 22 are crushed, and both of the tapes 20 and 22 are spread out over a wider area than the metal layer 44, exposure (protruding) of both of such tapes 20 and 22 to the pattern portion 36 is avoided.

Therefore, it is possible to avoid a situation in which the presence of both tapes 20 and 22 can be recognized when the user views the resin molded article 10 from the side of the cover layer 32. Accordingly, any concern over spoiling the aesthetic appearance of the resin molded article 10 can be dispensed with.

Furthermore, the guide tape 22 having a small thickness is provided at positions corresponding to the hollow projections 18, and the joining tape 20 having a large thickness is provided at a position corresponding to the flat upper surface 16 which is a concave portion relative to the hollow projections 18. Accordingly, even if the laminated body 14 having the design layer 28 with a small thickness and the cover layer 32 with a small thickness is joined to the joined member 12, a situation can be avoided in which a convex portion or concave portions corresponding to the hollow projections 18 or the upper surface 16 are formed on the design layer 28 and the cover layer 32. More specifically, the cover layer 32 remains substantially flat or smooth, regardless of the uneven shape of the joining surface of the joined member 12.

Further, the joining tape 20 and the guide tape 22 are spaced from each other (refer in particular to FIG. 3). Therefore, the flow passage 82 is formed between the joining tape 20 and the guide tape 22. When the laminated body 14 is joined to the joined member 12, or stated otherwise, when both of the laminated body and the joined member are placed in close contact with each other, the air present between both of them is discharged to the exterior through the flow passage 82. Therefore, it is possible to avoid a situation in which air remains between both of them, and due to such air, bubbles are formed.

The resin molded article 10 is obtained by joining the laminated body 14 to the joined member 12. In this instance, when the user observes the resin molded article 10 from the side of the cover layer 32, only those portions of the metal layer 44 that are not shielded by the printed layer 46, and more specifically, only the exposed portions 44a that are provided in the concave portions 42a and 42b are capable of being visually perceived. Since the concave portions 42a and 42b have three-dimensional shapes that are recessed toward the cover layer 32, the user recognizes, as a three-dimensional decoration, the decorative character "H" within the pattern portion 36. In this manner, according to the present embodiment, it is easy to provide the pattern portion 36 including the decorative character "H" having a rich three-dimensional feeling.

As noted previously, the first coating layer 54 and the second coating layer 56 are provided on the cover layer 32. Therefore, since rigidity is imparted to the cover layer 32, the occurrence of bending in the cover layer 32 is suppressed. Stated otherwise, the degree of flatness of the cover layer 32 is large. Therefore, the resin molded article 10 is aesthetically pleasing in appearance.

Further, since the cover layer 32 is advantageously retained on the resin base material layer 30, the cover layer 32 can be prevented from falling off from the resin base material layer 30 over a prolonged period of time.

Further, since the cover layer 32 is protected by the second coating layer 56, damage to the cover layer 32 is less likely to occur. In addition, contamination such as fingerprints or the like are prevented from adhering thereto.

The present invention is not particularly limited to the embodiments described above, and various modifications thereto are possible without departing from the essence and gist of the present invention.

For example, the thickness of the cover layer 32 may be set to a value that is greater than 200 µm.

Further, according to the present embodiment, an exemplary case has been illustrated in which the laminated body 14 is affixed to the curved surface of the joined member 12, however, it goes without saying that the laminated body 14 can be attached to a flat surface that is not curved.

Furthermore, the retaining layer 48 may be formed only as necessary, and may be omitted depending on the bonding strength between the metal layer 44 and the resin base material layer 30.

What is claimed is:

1. A method of manufacturing a resin molded article comprising:
   a resin base material layer made from an ultraviolet curable resin, and having a cover side end surface and a design side end surface forming a rear surface of the cover side end surface;
   a cover layer made from a polymer membrane, and provided on the cover side end surface of the resin base material layer; and
   a design layer provided on the design side end surface of the resin base material layer and configured to be visible through the cover layer;
   the method of manufacturing the resin molded article comprising:
   an introduction step of introducing an ultraviolet curable resin into a mold having an upper end which is an open end, to thereby obtain a precursor of the resin base material layer;
   a coating step of coating a first end surface of the cover layer made from polymer membrane with a first coating layer, while coating a second end surface forming a rear surface of the first end surface with a second coating layer;
   a placement step of placing the cover layer on an end surface of the precursor that is accommodated in the mold and faces toward the open end, in a manner so that the first coating layer is positioned on a lower side, and the second coating layer is positioned on an upper side;
   a leveling step of pressing the precursor on which the cover layer has been placed, through the cover layer, and leveling the end surface that faces toward the open end;
   a curing step of applying ultraviolet rays to the precursor to harden the precursor, and obtaining the resin base material layer on which the cover layer is provided on the cover side end surface; and
   a design layer producing step of providing the design layer on the design side end surface forming a rear surface of the cover side end surface of the resin base material layer,
   wherein a thickness of one of the first coating layer and the second coating layer lies within a range of 2 to 10 µm, and a thickness of a remaining one thereof lies within a range of 1 to 5 µm, and
   wherein the thickness of the first coating layer is set to be less than the thickness of the second coating layer, and the thickness of the first coating layer is set to be greater than or equal to half the thickness of the second coating layer.

2. The method of manufacturing the resin molded article according to claim 1, wherein a thickness of the cover layer lies within a range of 150 to 200 µm.

3. The method of manufacturing the resin molded article according to claim 1, wherein
   the resin base material layer, the first coating layer, the second coating layer and the cover layer are capable of transmitting light, and the design layer exhibits an opaque color, and
   in the curing step, the cover layer adheres to the resin base material layer through the first coating layer.

* * * * *